US012809191B2

(12) United States Patent
Suzuki et al.

(10) Patent No.: US 12,809,191 B2
(45) Date of Patent: Nov. 24, 2026

(54) DISPLAY DEVICE

(71) Applicant: ALPS ALPINE CO., LTD., Tokyo (JP)

(72) Inventors: Manabu Suzuki, Fukushima (JP); Akitomo Murata, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 199 days.

(21) Appl. No.: 18/765,550

(22) Filed: Jul. 8, 2024

(65) Prior Publication Data

US 2025/0035952 A1 Jan. 30, 2025

(30) Foreign Application Priority Data

Jul. 25, 2023 (JP) ................................ 2023-120718

(51) Int. Cl.
*G02B 30/56* (2020.01)

(52) U.S. Cl.
CPC .................................. *G02B 30/56* (2020.01)

(58) Field of Classification Search
CPC .................................................... G02B 30/56
See application file for complete search history.

(56) References Cited

U.S. PATENT DOCUMENTS 11,340,475 B2 5/2022 Yamamoto et al.
2017/0235114 A1* 8/2017 Suginohara ............ G02B 27/10 359/631
2017/0285359 A1 10/2017 Numata et al.
2018/0239190 A1 8/2018 Numata et al.
2021/0248926 A1 8/2021 Welch et al.
2022/0308347 A1 9/2022 Ashimine

FOREIGN PATENT DOCUMENTS

CN 114217441 3/2022
JP 2017-107165 6/2017
JP 2018-132712 8/2018
JP 2022-150245 10/2022

OTHER PUBLICATIONS

Extended European Search Report for 24188767.8 mailed on Jan. 8, 2025.

(Continued)

*Primary Examiner* — James A Dudek
(74) *Attorney, Agent, or Firm* — IPUSA, PLLC

(57) ABSTRACT

A display device for displaying an aerial image using retro-reflection includes: a light source configured to output an image; an optical member configured to split incident light into reflected light and transmitted light at a predetermined ratio; and a retro-reflective member configured to reflect light incident thereon from the optical member. In this display device, light representing the image is incident on the retro-reflective member through the optical member, and an aerial image is displayed by the light reflected by the retro-reflective member. The retro-reflective member is inclined such that light that is a specularly reflected part of the light incident on the retro-reflective member from the optical member is oriented in a direction away from a direction of the aerial image.

6 Claims, 7 Drawing Sheets

(56) References Cited

OTHER PUBLICATIONS

Suginohara Hidetsugu et al: 29-1: An Aerial Display: Passing through a Floating Image Formed by Retro-Reflective Reimaging, US SID Symposium Digest of Technical Papers, vol. 48, No. Jun. 12, 2017 (Jun. 2, 2017), pp. 406-409, XP093066609, ISSN: 0097-966X, DOI: 10.1002/sdtp. 11631 Retrieved from the Internet: URL:https://sid.onlinelibrary.wiley.com/doi/10.1002/sdtp. 11631 [retrieved on Dec. 5, 2024].

Korean Office Action for 10-2024-0095330 mailed on Oct. 17, 2025.

* cited by examiner (A) TOP VIEW (B) ONE CORNER CUBE (C) CROSS-SECTIONAL VIEW (A) PERSPECTIVE VIEW SEEN FROM ANGLE ABOVE (B) FRONT VIEW (C) TOP VIEW (D) SIDE VIEW (A) Y-Y CROSS-SECTIONAL VIEW (B) Y1-Y1 CROSS-SECTIONAL VIEW

DISPLAY DEVICE

CROSS-REFERENCE TO RELATED APPLICATION

The present application claims priority under 35 USC § 119 to Japanese Patent Application No. 2023-120718, filed Jul. 25, 2023, the contents of which are incorporated herein by reference in their entirety.

BACKGROUND OF THE INVENTION

Field of the Invention

The present disclosure relates to a display device that displays images in midair using retro-reflection.

Description of the Related Art

Aerial imaging by retro-reflection (AIRR) is known. Patent document 1 discloses a display device that uses two retro-reflective members so that images created in midair can be viewed from a wider range of angles. Patent document 2 also discloses a display device in which a light source and a retro-reflective member are positioned such that light that is specularly-reflected by the retro-reflective member does not enter the view range, thereby preventing or substantially preventing a deterioration of contrast and visibility.

RELATED-ART DOCUMENT

Patent Document

[Patent Document 1] Japanese Patent No. 2017-107165
[Patent Document 2] Japanese Patent No. 2022-150245

SUMMARY OF THE INVENTION

Problem to be Solved by the Invention

FIG. 1 is a schematic cross-sectional view showing a structure of an aerial image display device. The aerial image display device 10 includes: a light source (for example, a display that outputs images) 20; a beam splitter 30 that splits incident light into reflected light and transmitted light at a predetermined ratio; and a retro-reflective member 40.

An image that is emitted from the light source 20 is reflected by the beam splitter 30, and the reflected light travels toward the retro-reflective member 40. The retro-reflective member 40 is an optical member that reflects light in the same direction the incident light came from. The retro-reflective member 40 may include, for example, a corner-cube-like retro-reflective element, a triangular pyramid-like retro-reflective member, a bead-like retro-reflective member, or the like. The light reflected by the retro-reflective member 40 travels again toward the beam splitter 30, and the light that is transmitted through the beam splitter 30 converges and then diverges again, thereupon forming an aerial image 50 in front of the viewer's eyes. The aerial image 50 is created at a position symmetrical to the light source 20 with respect to the face of the beam splitter 30. The user can view the aerial image 50 only in the range in which the retro-reflective member 40 can be seen from the user's viewpoint over the beam splitter 30.

Part (A) in FIG. 2 is a top view of a corner-cube-like retro-reflective member. Part (B) in FIG. 2 is a top view showing one corner cube. Part (C) in FIG. 2 is a schematic cross-sectional view of the retro-reflective member. As shown in part (B) in FIG. 2, one corner cube has a concave shape formed by connecting the right-angled vertices of three right-angled isosceles triangles (the right-angled vertex is the deepest part). Incident light Lin is reflected three times on individual faces of the corner cube. Reflected light Lout is emitted in the same direction the incident light Lin came from. When this takes place, an optical path difference D is produced between the incident light Lin and the reflected light Lout.

Part (A) of FIG. 3 is a cross-sectional view showing a specific example structure of the retro-reflective member. The retro-reflective member 40 includes: a pattern forming part 42 made of an optically transparent material; a reflective layer 44 (for example, Al) formed on the angled face of the pattern forming part 42; an adhesive 46 applied to the upper face of the pattern forming part 42; and a phase plate (for example, a λ/4 plate) 48 formed on the adhesive 46. The reflective layer 44 acts as a reflective layer, and its thickness including the adhesive 46 and the phase plate 48 is generally 1 mm or less.

Incident light on the retro-reflective member 40 is reflected multiple times by the reflective layer 44. As shown in part (B) of FIG. 3, the reflected light Lout is emitted in the same direction the incident light Lin came from. Given these optical properties of the retro-reflective member 40, the retro-reflected light La is intended light (or desirable light).

On the other hand, part of the incident light is reflected by a surface of the phase plate 48, for example (reflected light Li). As shown in part (C) of FIG. 3, this reflected light Li is specularly-reflected light that is produced when the relationship: incident angle θ=the reflection angle θ holds. In other words, the reflected light Li is light that does not rely on the optical properties of the retro-reflective member 40, that is, unintended light Lb.

FIG. 4 is a diagram for explaining a problem with a conventional aerial image display device. As described earlier, when the retro-reflective member 40 produces unintended reflected light Lb through specular reflection, a false aerial image is produced due to the specularly-reflected light Lb. The false aerial image is reflected and gets in the range in which the user views the aerial image 60, thus impairing the visibility and contrast of the aerial image 60.

The present disclosure therefore aims to solve the problem with related art by providing a display device that improves the visibility and contrast of aerial images.

Means for Solving the Problem

A display device according to the present disclosure displays an aerial image using retro-reflection. This display device includes: a light source configured to output an image; an optical member configured to split incident light into reflected light and transmitted light at a predetermined ratio; and a retro-reflective member configured to reflect light incident thereon from the optical member. In this display device, light representing the image is incident on the retro-reflective member through the optical member, and an aerial image is displayed by the light reflected by the retro-reflective member. The retro-reflective member is inclined such that light that is a specularly reflected part of the light incident on the retro-reflective member from the optical member is oriented in a direction away from a direction of the aerial image.

According to another example of the present disclosure, the retro-reflective member includes a first reflective face and a second reflective face meeting the first reflective face at a predetermined angle. According to yet another example of the present disclosure, the retro-reflective member is inclined with respect to a main face of the optical member. According to yet another example of the present disclosure, the retro-reflective member is inclined such that the specularly-reflected part of the light does not enter a field of view of a user.

Advantageous Effects of the Invention

According to the above-summarized present disclosure, the retro-reflective member is tilted such that specularly-reflected light from the optical member is oriented in a direction away from the direction of an aerial image. Consequently, the user is prevented or substantially prevented from viewing a specular reflection-induced false aerial image in the range in which the user views the aerial image, thereby improving the visibility and contrast of the aerial image.

DETAILED DESCRIPTION OF THE DISCLOSURE

The present disclosure display device displays images in mid-air using the AIRR method. The present disclosure of a display device can be applied to a user input interface using an aerial image. Note that the drawings referred to in the following description of embodiments include exaggerated views to help understand the present invention, and do not directly or accurately represent the actual shape or scale of the product.

Embodiments

Figure 5:
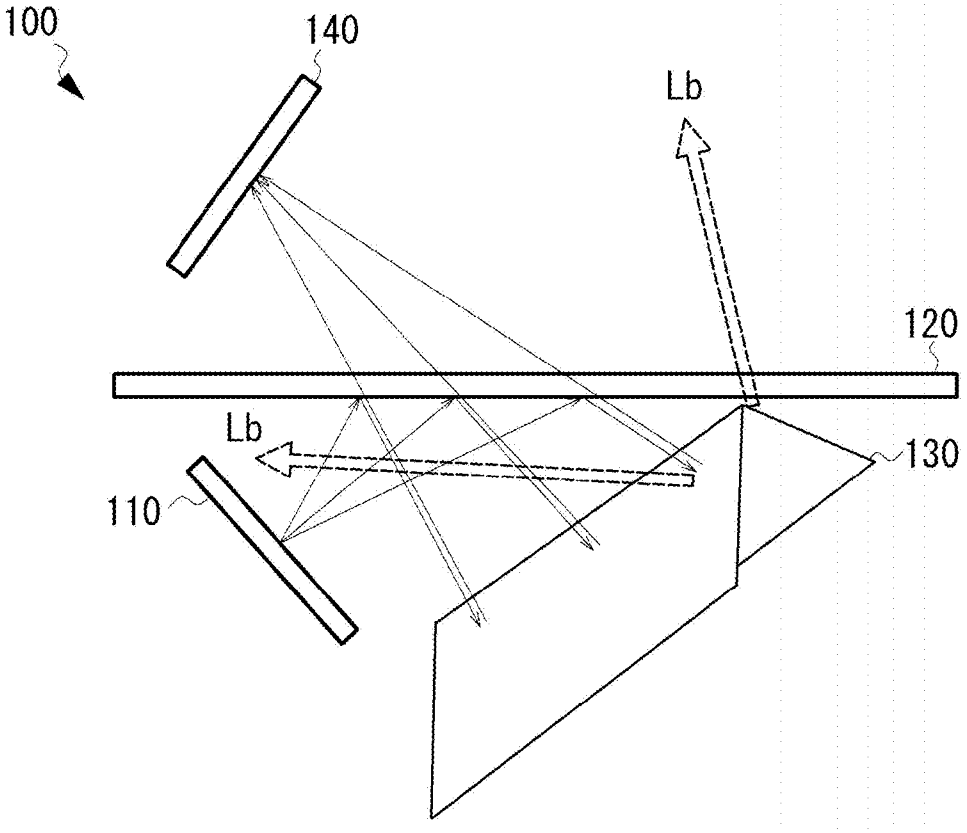
FIG. 5 is a perspective view showing a schematic structure of an aerial image display device according to a first embodiment of the present disclosure.

The present disclosure's embodiments will now be described in detail with reference to the accompanying drawings. FIG. 5 is a perspective view showing a structure of an aerial image display device according to a first embodiment of the present disclosure. As shown in this drawing, an aerial image display device 100 of the present embodiment is structured to include: a light source 110 such as a display for displaying images; a beam splitter (or a half-mirror) 120 that splits incident light into transmitted light and reflected light at a certain ratio; and a retro-reflective member with mountain shape 130. An aerial image 140, which is an image output by the light source 110, is displayed by the AIRR method.

A distinctive feature of the present embodiment is that the retro-reflective member 130 does not provide a flat surface but has a chevron shape. This is to prevent as much of unintended reflected light Lb caused by the retro-reflective member 130 as possible from entering the field of view of the aerial image 140.

Figure 1:
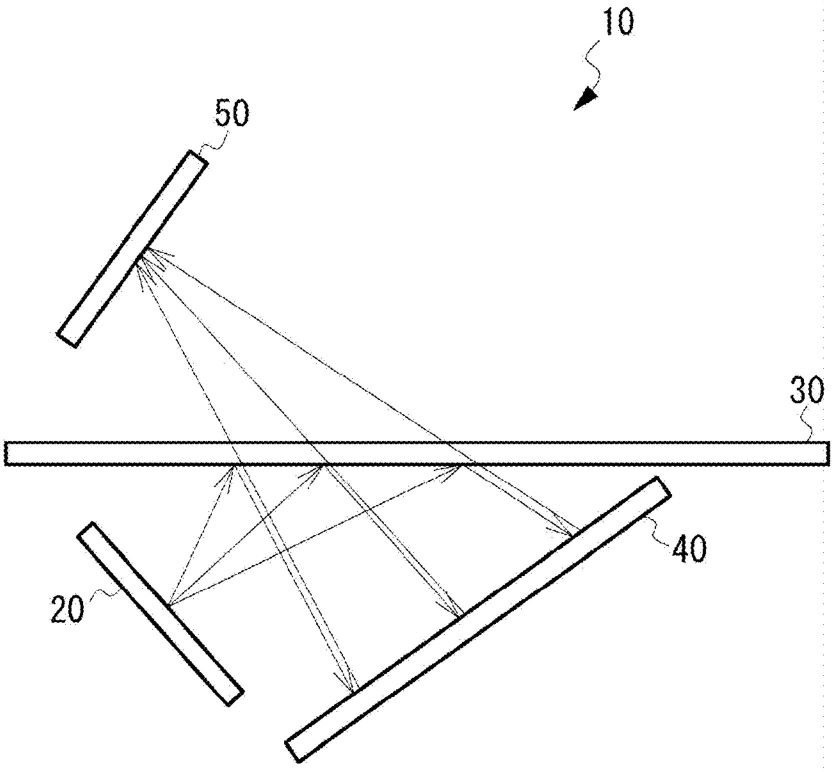
FIG. 1 is a diagram showing an example structure of a conventional aerial image display device that uses retro-reflection.
Figure 2:
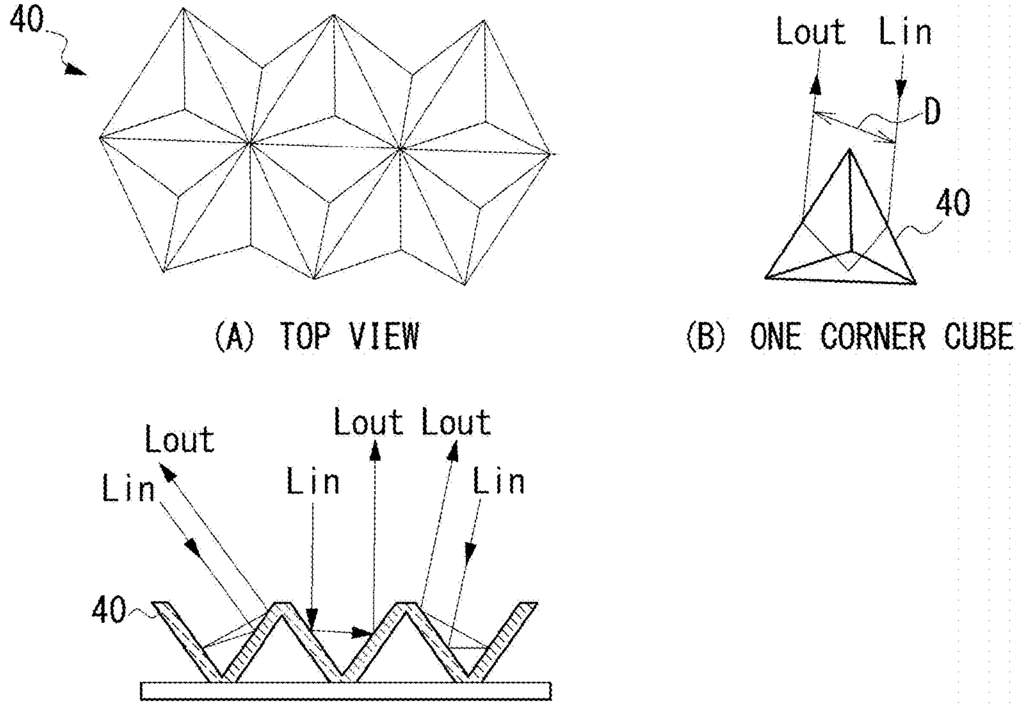
FIG. 2 is a diagram explaining the optical properties of a corner-cube-like retro-reflective member.
Figure 3:
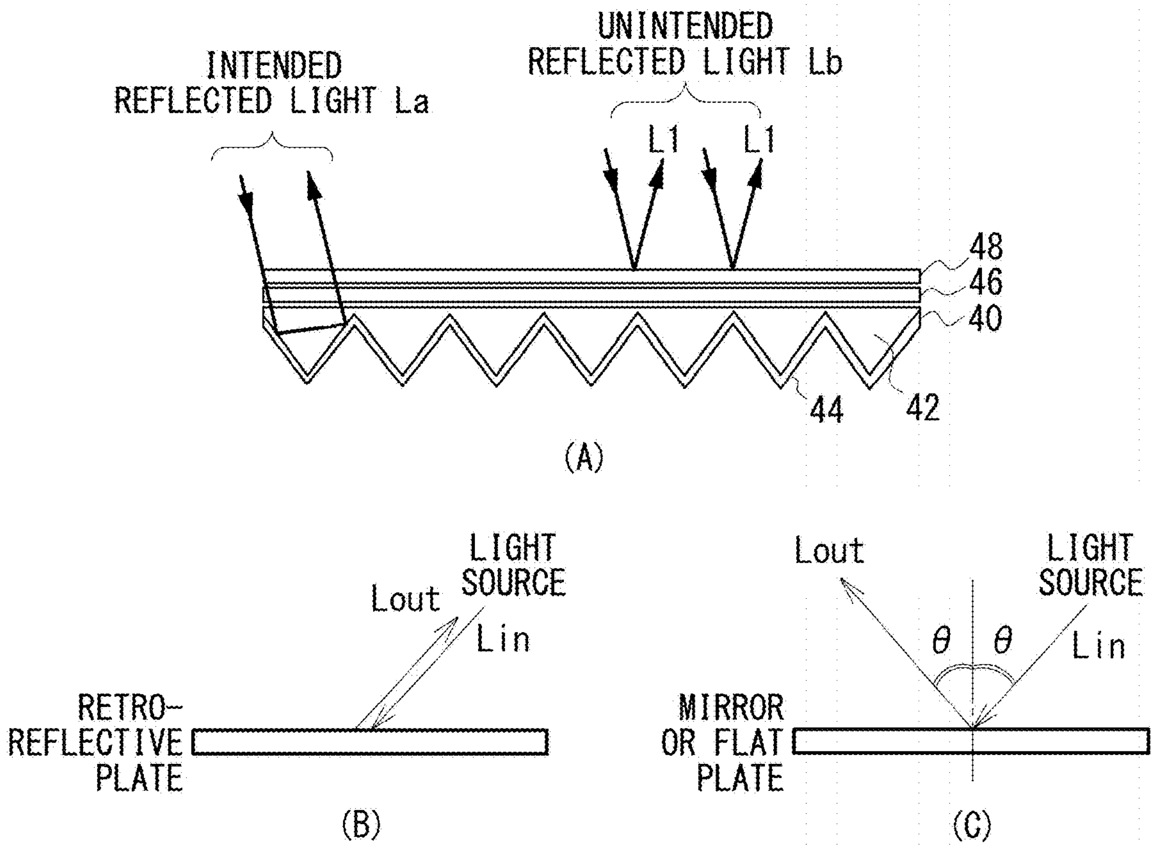
FIG. 3 provides a cross-sectional view showing an example structure of a retro-reflective member, a schematic diagram showing the relationship between incident light and reflected light in a mirror or the like, and a schematic diagram showing the relationship between incident light and reflected light on a retro-reflective plate.
Figure 4:
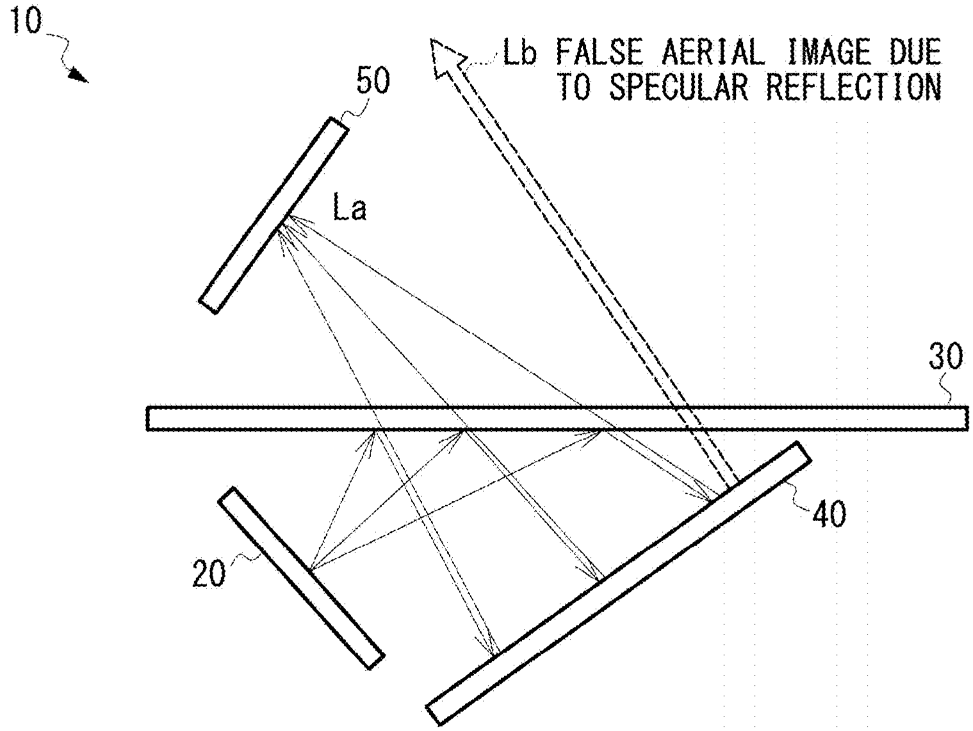
FIG. 4 is a diagram illustrating a problem with a conventional aerial image display device.
Figure 6:
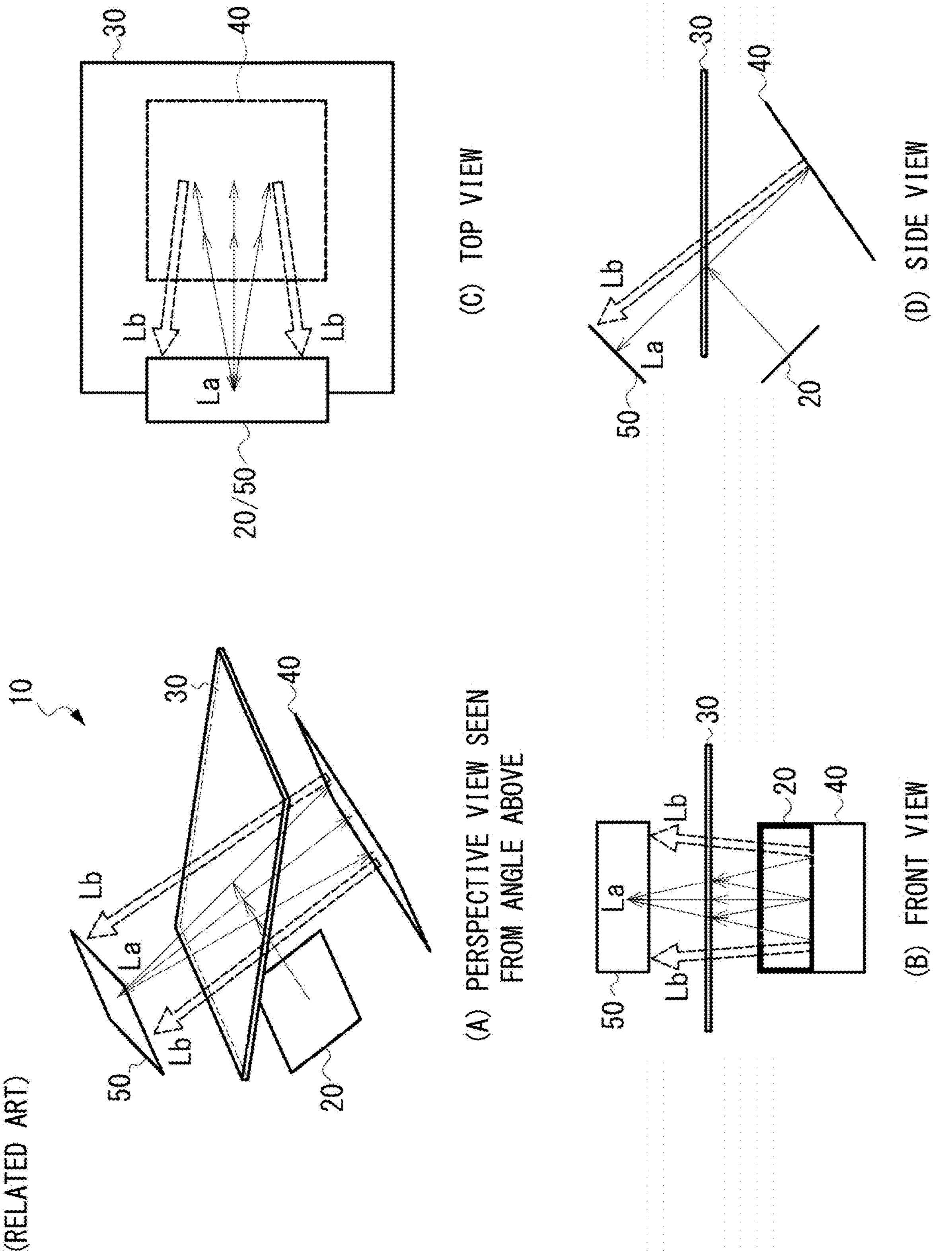
FIG.6 (RELATED ART)
FIG. 6 provides a set of diagrams showing, in a schematic way, the relationship between the components and optical paths of a conventional aerial image display device.
Figure 7:
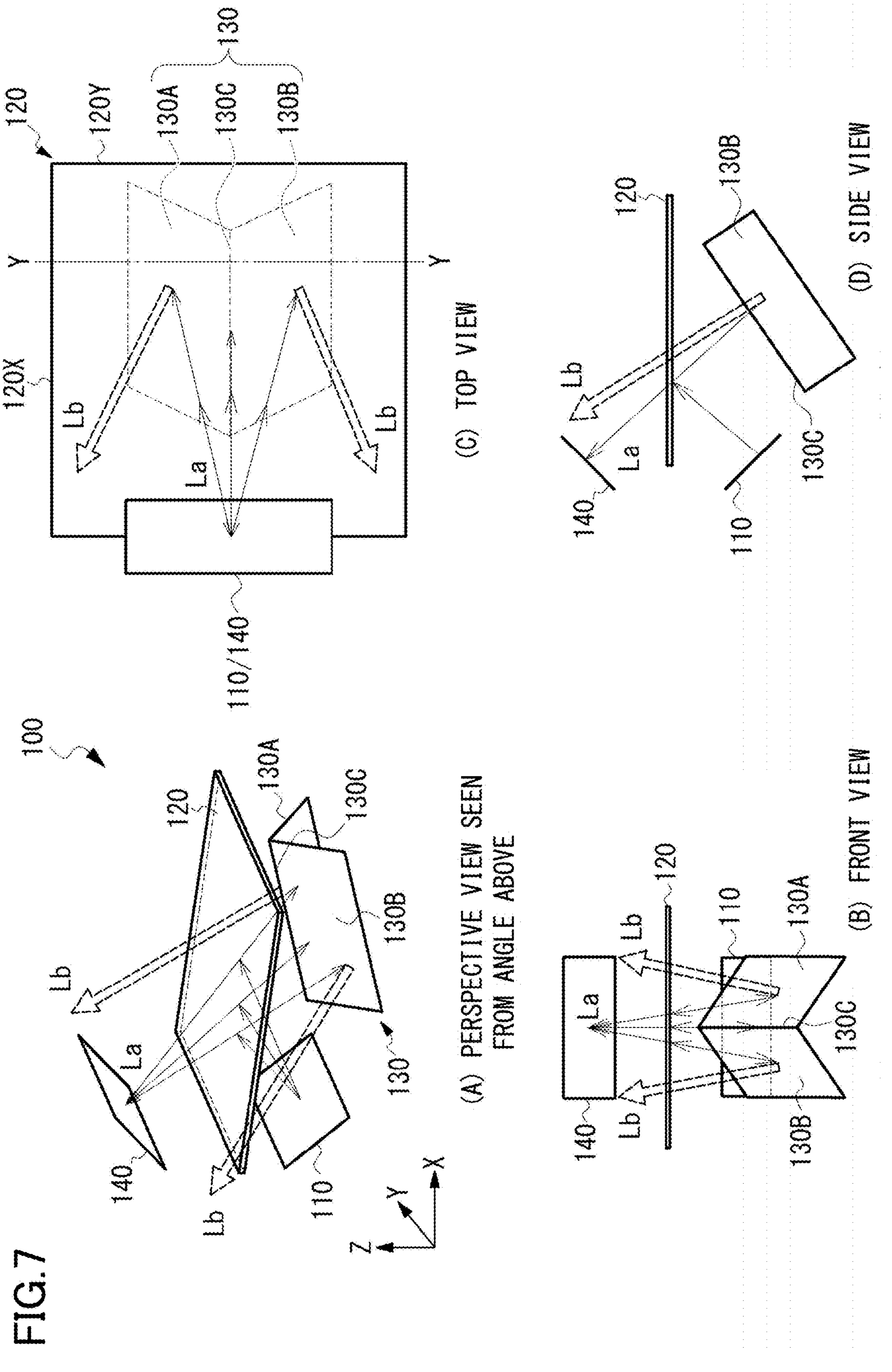
FIG. 7 provides a set of diagrams showing, in a schematic way, the relationship between the components and optical paths of the aerial image display device according to the first embodiment of the present disclosure.
Figure 8:
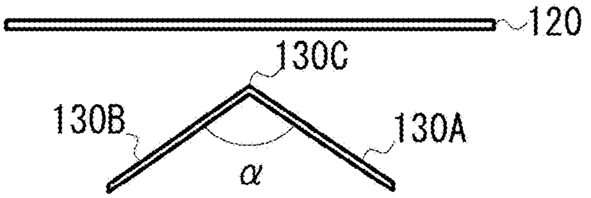
FIG. 8 shows a cross-sectional view taken along the line Y-Y in part (C) of FIG. 7 and a cross-sectional view taken along the line Y1-Y1 in part (C) of FIG. 10.
Figure 8:
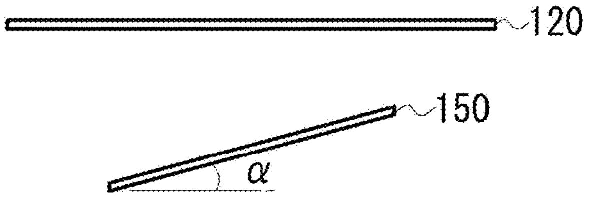

FIG. 6 provides a perspective view, a front view, a top view, and a side view; each view shows the relationship between the components of the conventional aerial image display device shown in FIG. 4 and incident light/reflected light in a schematic way. FIG. 7 also provides a perspective view, a front view, a top view, and a side view; each view shows the relationship between the components of the aerial image display device of the first embodiment and incident light/reflected light. Part (A) in FIG. 8 is a cross-sectional view taken along the line Y-Y in part (C) of FIG. 7. The operation of the aerial image display device of the present embodiment will be described with reference to these drawings.

Referring to FIG. 6, in a conventional aerial image display device 10, a light source 20 and a retro-reflective member 40 are positioned below a beam splitter 30. The retro-reflective member 40 has a generally flat main face. An aerial image 50 is displayed by light La that is reflected in the same direction the incident light came from. On the other hand, since the main face of the retro-reflective member 40 is flat, light Lb that is specularly-reflected by the retro-reflective member 40 travels in the direction of the aerial image 50. When the specularly-reflected light Lb enters the range (field of view) where the user can view the aerial image 50, the user sees a false aerial image.

In contrast, in the aerial image display device 100 of the present embodiment, as shown in FIG. 7, the retro-reflective member 130 has a mountain-shaped reflective face. Except for the structure of the retro-reflective member 130, the rest of the structure of the aerial image display device 100 is the same or substantially the same as that of the conventional aerial image display device 10.

Here, the beam splitter 120 is positioned such that its main face is parallel to the X-Y plane. As shown in part (C) of FIG. 7, the beam splitter 120 has a rectangular shape in the X-Y plane, and has a first side 120X that extends in the X direction and a second side 120Y that extends in the Y direction. Furthermore, when the direction normal to the light source 110, for example the display face of a display, is taken as the optical axis, the direction when the optical axis is projected onto the X-Y plane is the X direction, which is parallel to the first side 120X.

In one example, the retro-reflective members 130 includes: a generally flat rectangular first reflective face 130A; a generally flat rectangular second reflective face 130B; and a top side 130C where the first reflective face 130A and the second reflective face 130B meet. The first reflective face 130A and the second reflective face 130 may be formed by bending a single retro-reflective member, or by joining two retro-reflective members together using an adhesive or the like. Also, the first reflective face 130A and the second reflective face 130B may be structured so as to be symmetric about the top side 130C, or to be asymmetric about the top side 130C, for example.

The retro-reflective member 130 is positioned such that the direction in which the top side 130C is projected onto the X-Y plane is parallel to the X direction, that is, the optical axis on the X-Y plane, and the top side 130C is inclined in the Z direction with respect to the main face of the beam splitter 120. As a result of this, as shown in the Y-Y cross-section in part (A) of FIG. 8, the first reflective face 130A and second reflective face 130B are inclined laterally from the top side 130C, so as to be away from the main face of the beam splitter 120. The meeting angle α between the first reflective face 130A and the second reflective face 130B is set such that all or a part of the specularly-reflected light Lb is oriented in a direction away from the direction of the range in which the user can view the aerial image 140.

When the light source 110 outputs an image, light representing the image is emitted along the optical axis. The light is reflected by the beam splitter 120 and by the retro-reflective member 130, and then transmitted through the beam splitter 120 to display an aerial image 140. Although the retro-reflective member 130 has reflective faces 130A and 130B that are bent into an angled shape, given the optical properties of the retro-reflective member 130, the reflected light is emitted in the same direction the incident light came from. That is, light La that is retro-reflected by the retro-reflective member 130, that is, the intended reflected light La, produces the aerial image 140, as when the retro-reflective member 40 of the conventional aerial image display device 10 shown in FIG. 6 is used.

On the other hand, although part of the incident light from the beam splitter 120 is specularly-reflected by the retro-reflective member 130, because the first and second reflective faces 130A and 130B are inclined laterally from the top side 130C, the angle of incidence of the light incident on the first and second reflective faces 130A and 130B becomes larger than when the first and second reflective faces 130A and 130B are not inclined laterally. This increases the reflection angle of the specularly-reflected light Lb on the first and second reflective faces 130A and 130B. The specularly-reflected, unintended light Lb is oriented in a direction away from the direction of the aerial image 140. As a result of this, the user is less likely to view a specular reflection-induced false aerial image in the range in which the user views the aerial image 140, so that the visibility and contrast of the aerial image 140 can be improved.

Figure 9:
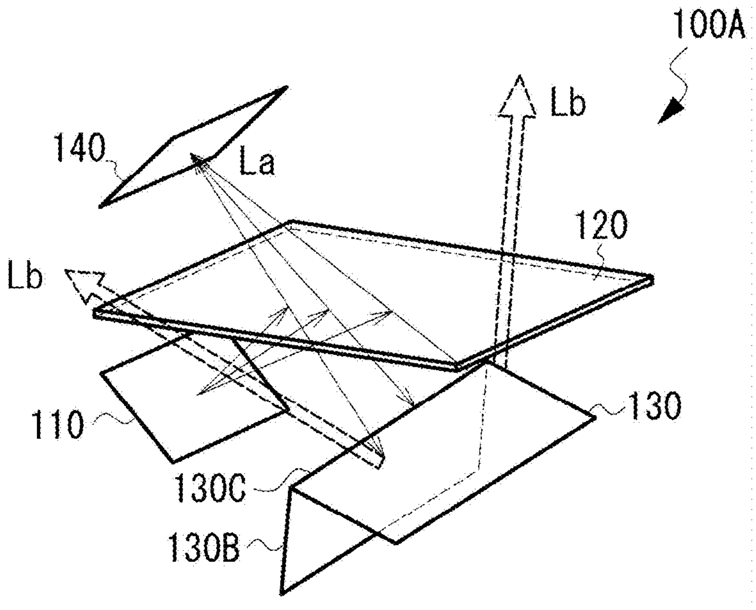
FIG. 9 is a diagram showing a variation of the first embodiment.

An example has been shown with the above embodiment in which the direction of the top side 130C projected onto the X-Y plane is the X direction, that is, the same direction as the direction of the optical axis of the light source 110. However, the retro-reflective member 130 may be rotated horizontally, for example, through 90 degrees. In this case, in the aerial image display device 100A shown in FIG. 9, the direction of the top side 130C projected onto the X-Y plane is the Y direction, which is perpendicular to the direction of the optical axis of the light source 110. When this structure is employed, the light Lb that is specularly-reflected by the retro-reflective member 130 is oriented in a direction away from the direction of the aerial image 140, making it less likely that the user views a false aerial image.

Figure 10:
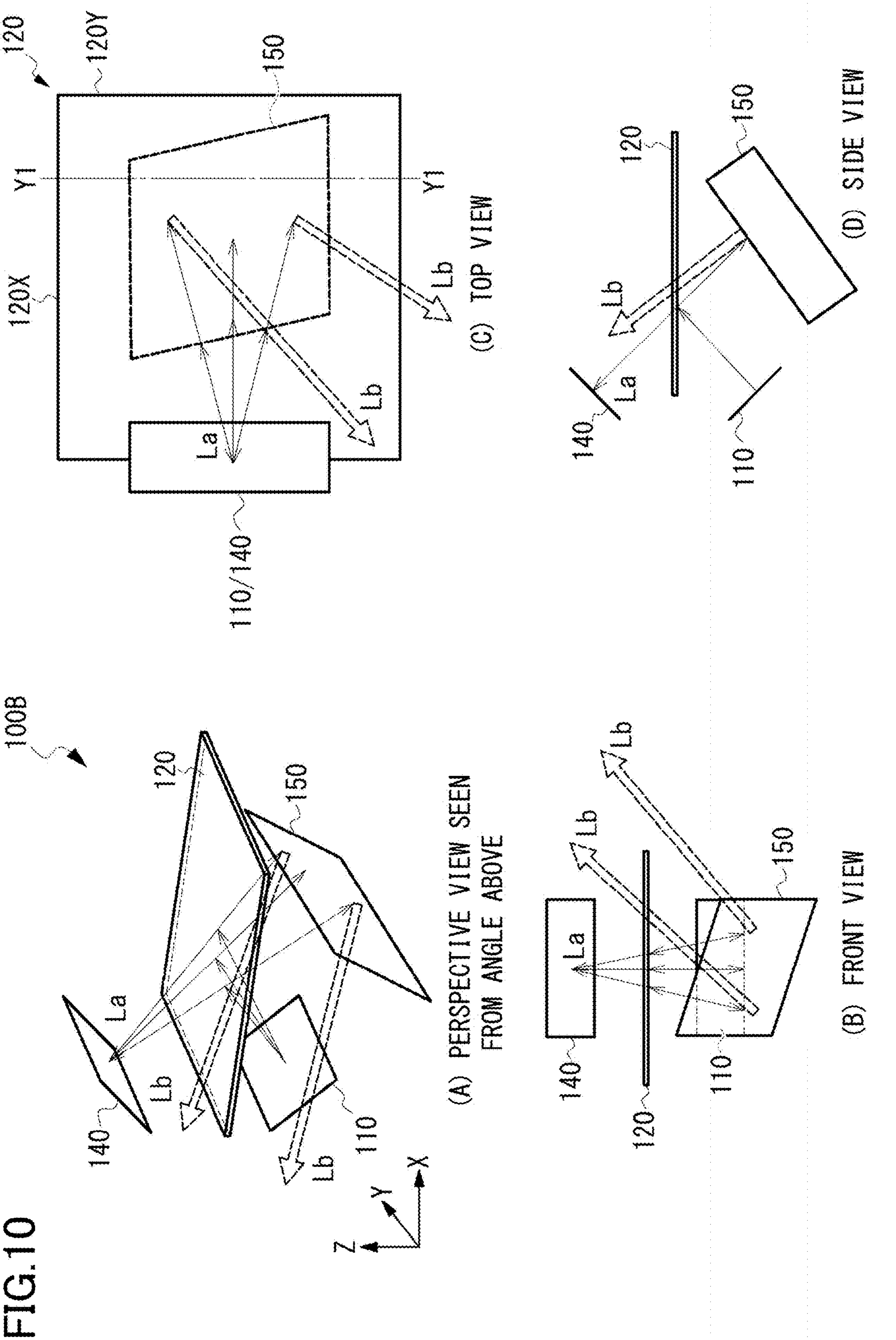
FIG. 10 is a diagram showing, in a schematic way, the relationship between components and optical paths of an aerial image display device according to the second embodiment of the present disclosure.

Next, a second embodiment of the present disclosure will be described. FIG. 10 is a diagram showing a structure of an aerial image display device 100B according to the second embodiment. Parts that are the same as in the first embodiment shown in FIG. 7 will be assigned the same reference numerals.

In the second embodiment, the retro-reflective member 150 provides a generally flat main face. As shown in the Y1-Y1 cross-section in part (B) of FIG. 8, a retro-reflective member 150 is inclined at an angle α with respect to the main face of a beam splitter 120. The direction of inclination may be reversed. In other words, the retro-reflective member 150 corresponds to either the first reflective face 130A or the second reflective face 130B in the first embodiment. The angle α is set such that, when part of the incident light from the beam splitter 120 is specularly-reflected by the retro-reflective member 150, the specularly-reflected light Lb is oriented in a direction away from the direction of the field of view of the aerial image 140. This improves the visibility and contrast of the aerial image 140.

In this way, according to the present embodiment, light that is specularly-reflected by the retro-reflective member is oriented in a direction away from the direction of the aerial image, thereby preventing or substantially preventing the user from viewing a specular reflection-induced false aerial image in the range in which the aerial image is viewed, thereby improving the visibility and contrast of the aerial image.

The shapes and sizes of the beam splitter and retro-reflective member shown in the above embodiments are simply examples, and other shapes and sizes may be used as well. In addition, the retro-reflective member has a first and second reflective face and is shaped like a mountain in the above examples. However, the retro-reflective member may be structured to have three or more reflective faces, like a triangular or square pyramid. Furthermore, the angle of the angled shape of the retro-reflective member and the inclination angle α of the retro-reflective member are selected appropriately so as to provide a design that is suitable for optical aerial imaging.

The aerial image display device of the present embodiment can be applied to a user interface, and, for example, aerial imaging can be applied to computer devices, in-vehicle electronic devices, ATMs at banks, ticket vending machines at train stations, elevators' operating buttons, and the like.

Although preferred embodiments of the present disclosure have been described in detail above, the present disclosure is by no means limited to specific embodiments, and various modifications and changes are possible within the scope of the gist of the invention described in the accompanying claims.

What is claimed is:

1. A display device for displaying an aerial image using retro-reflection, the display device comprising:
- a light source configured to output an image;
- an optical member having a main surface configured to split incident light into reflected light and transmitted light at a predetermined ratio; and
- a retro-reflective member configured to reflect light incident thereon from the optical member,
- wherein light representing the image is incident on the retro-reflective member through the optical member, and an aerial image is displayed by the light reflected by the retro-reflective member, and
- wherein an upper edge of the retro-reflective member in a vertical direction is inclined with respect to the main face of the optical member, such that light that is a specularly reflected part of the light incident on the retro-reflective member from the optical member is oriented in a direction away from a direction of the aerial image.

2. The display device according to claim 1, wherein the retro-reflective member includes a first reflective face and a second reflective face meeting the first reflective face at a predetermined angle.

3. The display device according to claim 1, wherein the retro-reflective member is inclined such that the specularly-reflected part of the light does not enter a field of view of a user.

4. The display device according to claim 2, wherein the first reflective face and the second reflective face of the retro-reflective member meet each other at a ridge line, the ridge line being inclined with respect to the main surface of the optical member.

5. The display device according to claim 4, wherein specularly-reflected light from the first reflective face and specularly-reflected light from the second reflective face are oriented in different directions away from each other and away from the aerial image.

6. The display device according to claim 1, wherein the retro-reflective member includes a retro-reflective layer and a surface layer covering the retro-reflective layer, and wherein specularly-reflected light resulting from light incident on a surface of the surface layer is oriented in the direction away from the direction of the aerial image.

* * * * *